United States Patent
Murray

(10) Patent No.: US 10,623,422 B2
(45) Date of Patent: Apr. 14, 2020

(54) PROTOCOL TO DETECT A FOREIGN DEVICE CONNECTED BETWEEN NETWORK MODULES

(71) Applicant: HEWLETT PACKARD ENTERPRISE DEVELOPMENT LP, Houston, TX (US)

(72) Inventor: Christopher Murray, Boynton Beach, FL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 200 days.

(21) Appl. No.: 15/966,038

(22) Filed: Apr. 30, 2018

(65) Prior Publication Data
US 2019/0334935 A1 Oct. 31, 2019

(51) Int. Cl.
| H04L 29/06 | (2006.01) |
| H04L 12/24 | (2006.01) |
| H04L 29/12 | (2006.01) |
| H04L 12/26 | (2006.01) |

(52) U.S. Cl.
CPC ...... *H04L 63/1416* (2013.01); *H04L 41/0681* (2013.01); *H04L 41/12* (2013.01); *H04L 43/0811* (2013.01); *H04L 61/6022* (2013.01)

(58) Field of Classification Search
CPC ............. H04L 63/1416; H04L 43/0811; H04L 41/0681; H04L 61/6022; H04L 41/12
USPC .......................................................... 726/23
See application file for complete search history.

(56) References Cited

U.S. PATENT DOCUMENTS

| 8,670,299 B1 | 3/2014 | Shukla et al. |
| 8,832,428 B2 | 9/2014 | Ota et al. |
| 9,468,033 B2 | 10/2016 | Naqvi et al. |
| 2003/0142685 A1* | 7/2003 | Bare .................. H04L 67/1002 370/410 |
| 2010/0265833 A1* | 10/2010 | Ou ......................... H04L 69/28 370/252 |

(Continued)

FOREIGN PATENT DOCUMENTS

CN 101667941 3/2010

OTHER PUBLICATIONS

"How to Configure Intrusion Detection System," in Software Configuration Guide, Cisco IOS XE Denali 16.3x (Catalyst 3650 Switches) 4 pages.

*Primary Examiner* — Kambiz Zand
*Assistant Examiner* — Aubrey H Wyszynski
(74) *Attorney, Agent, or Firm* — Nolte Intellectual Property Law Group

(57) ABSTRACT

Detecting a foreign device is connected between what are expected to be directly connected network modules may present a network security concern. Disclosed is a protocol and method for detecting that an unexpected (i.e., foreign) device is in an unexpected location in a network path. For example, connected between two network nodes that are expected to be directly connected to each other. Scalable compute resources may rely on direct network connectivity to provide high availability, throughput, and security. Accordingly, determining a foreign device exists in the network path between two frame link modules (FLMs), for example, may address this need for security and reliability. A device connected to sniff network data may not advertise itself to the network and therefore may be actively detected using the disclosed methods.

20 Claims, 8 Drawing Sheets

(56) References Cited

U.S. PATENT DOCUMENTS

| | | | |
|---|---|---|---|
| 2010/0329232 A1* | 12/2010 | Tubb | E05B 39/00 |
| | | | 370/345 |
| 2012/0263177 A1* | 10/2012 | Qian | H04L 12/4625 |
| | | | 370/390 |
| 2013/0343179 A1* | 12/2013 | Madaiah | H04L 12/437 |
| | | | 370/222 |
| 2015/0134851 A1* | 5/2015 | Relan | H04L 45/126 |
| | | | 709/241 |
| 2015/0181499 A1* | 6/2015 | Azuma | H04L 41/0803 |
| | | | 370/231 |
| 2016/0218967 A1* | 7/2016 | Cordes | G06F 3/067 |
| 2017/0302570 A1* | 10/2017 | Liu | H04L 43/0847 |

* cited by examiner

PROTOCOL TO DETECT A FOREIGN DEVICE CONNECTED BETWEEN NETWORK MODULES

BACKGROUND

In the field of scalable compute resources, network connectivity between nodes, blades, or frames, of adjacent network modules may represent a primary communication path for sharing data between those nodes. The data may represent inputs to compute process (e.g., data or applications), outputs of compute resources (e.g., compute results), communications to coordinate distributed processes, and other types of data In some architectures, adjacent nodes of network modules within a blade server, cluster, or frame may be expected to be directly connected to each other without any intervening network resource.

An intervening network resource may represent an incorrect configuration (e.g., honest system administrator mistake), a potential additional point of failure, or even a security risk (e.g., an intrusion system attempting to steal data from the network). In any case, it may be desirable to actively detect an unexpected "foreign" device between nodes that may be normally directly connected. Once detected the system administrator may be made, aware of the foreign device and take, appropriate action (e.g., remove the device), Note, that in some cases the foreign device will not be readily apparent in the network because it may not advertise its existence to other devices. Further, in the case of a security intrusion, the foreign device may actively try to conceal its existence. Typically, the foreign device will simply forward every packet it receives immediately along the network path so that latency delays are minimized. Of course, prior to forwarding, a device configured to "steal" network data would likely make a copy of that packet for some use that may be undesirable for the owner of the network (e.g., corporation, research division, etc.).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Network security, fault tolerance, and performance represent important considerations for computer networks. One security aspect includes protecting the links between directly connected network modules to ensure they are directly connected as expected and no foreign device may be present to eaves drop on network communications. In some scalable compute resource implementations, network modules provide access to compute modules in each frame.

Figure 1:
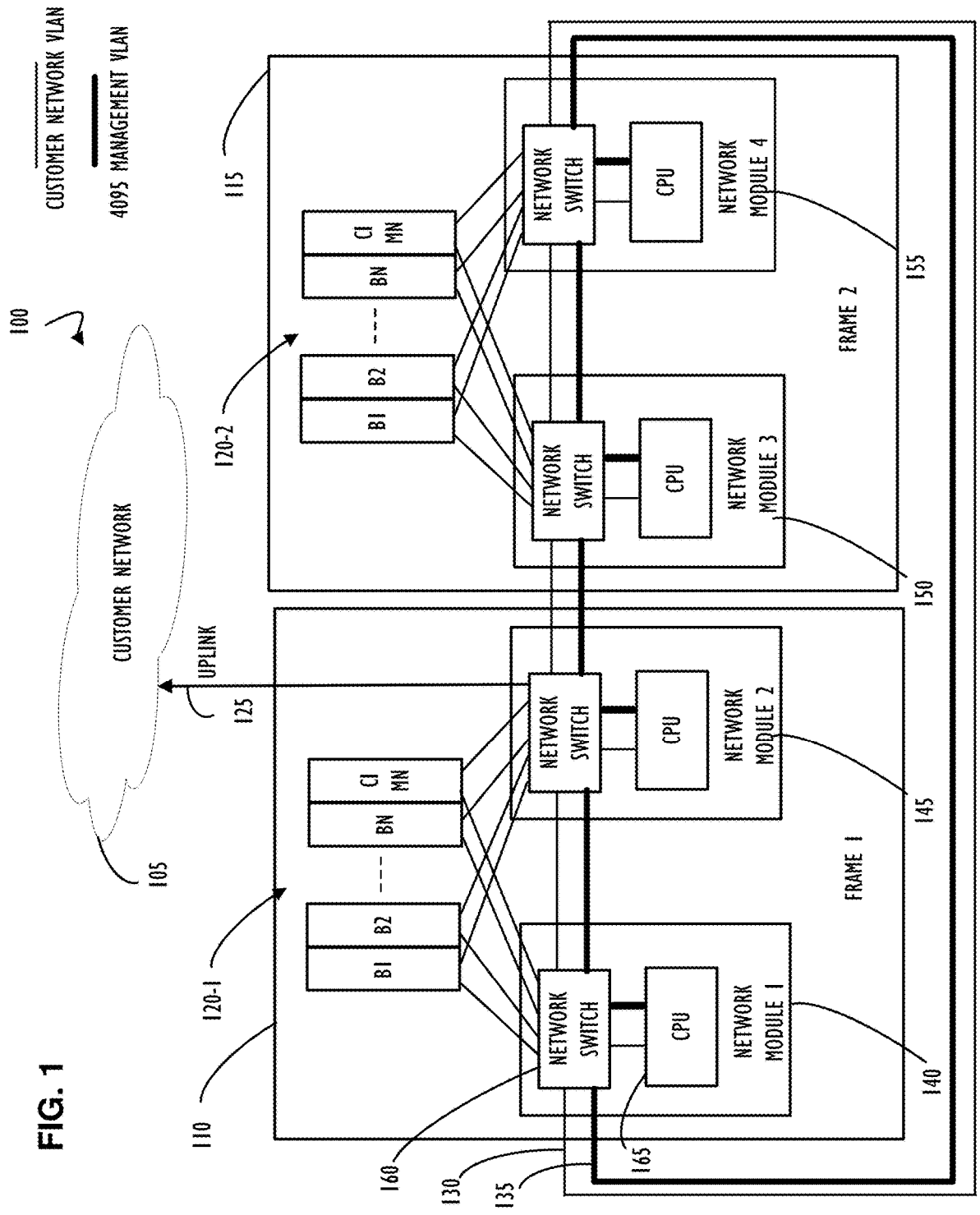
FIG. 1 is a functional block diagram of a computer infrastructure including multiple frame saleable compute resources, a customer VLAN, and a management VLAN, according to one or more disclosed implementations.

Referring to FIG. 1, an example computer infrastructure 100 is illustrated. In this example, customer network 105 is connected to a set of frames (represented by frame 1 110, and frame 2 115). Of course, more than two frames may be present but for simplicity of this disclosure only two are shown in this example. As indicated by arrow 120-1, frame 1 may be configured with a set of blades (B1, B2, ... BN) and a Composable Infrastructure (CI) module. Similarly, arrow 120-2 indicates that frame 2 may be configured in a like manner. Frame 1 further includes two network modules 140 and 145 (sometimes referred to as a Frame Link Module (FLM)). Frame 2 also include two network modules 150 and 155. These network modules provide connectivity for the compute resources represented by the blades. Each of the blades is shown with a network connection to a network switch 160 disposed within each individual network module (e.g., network module 1, 140). Each network module further includes a CPU 165 to facilitate configuration, monitoring, and maintenance of a corresponding network switch 160.

Connectivity from a set of frames to a customer network is typically provided by a single uplink 125 from exactly one of the plurality of network switches that exist across the multiple FLMs of a group of connected frames. That is, all communications external to the group of connected frames passes through uplink 125. As further illustrated in computer infrastructure 100, customer VLAN 130 connects each of the network switches 160 in an ethernet ring network and extends to the customer network 105 (e.g., includes VLANS 1-4094). A second ring network, 4095 management VLAN 135, is also shown in FIG. 1. 4095 management VLAN is shown in a bolder line than customer VLAN 130 and also connects each of the network switches 160. Note, in a proper configuration of a group of frames, each network switch will be directly connected to each neighboring switch (either in the same frame or an adjacent frame) and no intervening network devices are present.

A virtual LAN (VLAN) refers to a broadcast domain that is partitioned and isolated in a computer network at the data link layer (OSI layer 2). LAN is the abbreviation for local area network and in this context virtual refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4095 management VLAN 135 in FIG. 1.

Figure 2:
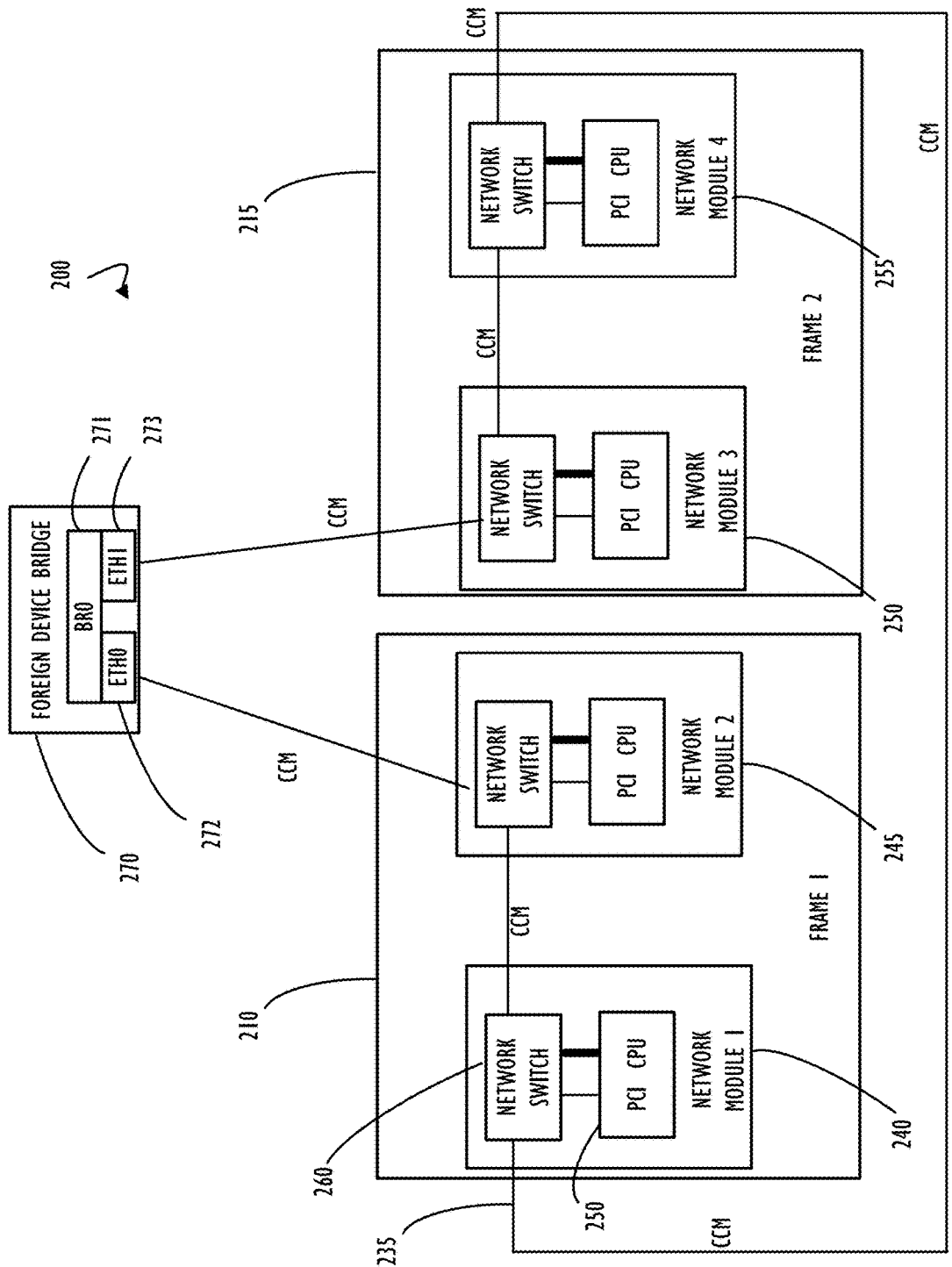
FIG. 2 is a functional block diagram representing a first example of a foreign device disposed physically between two network switches that expect to be physically adjacent to each other on the network, according to one or more disclosed implementations.

Referring now to FIG. 2, computer infrastructure 200 illustrates a non-optimal, likely problematic, connectivity between network frames. As explained for FIG. 1, a proper connectivity is where the network modules in each frame are directly linked together by external links (links between frame 1 210 and frame 2 215). However, in the example of FIG. 2, the links between Network Module 2 245 and Network Module 3 250 do not represent a direct connection. In this scenario, a foreign device bridge 270 has been inserted (incorrectly) into that network segment. This may represent a security concern because the links between network modules may be connected to, for example, a Linux server setup as a bridge or an unmanaged switch and all the data sent on the internal network can be monitored or modified by that foreign device. Implementations of this disclosure will explain a method to detect a foreign device improperly located between connected network modules. That is, the network modules are still connected to each other on the network, but they are not directly connected to each other as they are supposed to be.

From a network communication perspective, it may be difficult to determine that foreign device bridge 270 is in the network. This is, in part, because ETH0 272, BR0 271, and ETH1 273 simply pass packets between network module 1 245 and network module 2 250. Of course, a very slight latency may be added but this extra delay may be too small to notice. In fact, foreign device bridge 270 may be configured to attempt to conceal its existence to other network devices because it may be acting in a rouge capacity to steal information from the network. Being able to detect this situation, using the disclosed implementations, represents an improvement to the technical field of network security.

In this disclosure, a ring topology of network modules will be discussed, however, the techniques of this disclosure are not limited to a particular network topology. The disclosed method of foreign device detection is suitable for any network topology where the network modules are expected to be directly connected to together. Implementations of this disclosure may be used to focus on network segments where there are expected to be network links that directly connect adjacent network modules.

There are at least two methods to determine if a network link is enabled and connected between two network modules. A first method, referred to as a network state method, includes reading the state of the link and possibly toggling the link at either end to see if there was a change at both ends. For example, measuring if the two links form a circuit. A second method, referred to as a software communication method, includes sending messages point to point between the network modules. These messages may be used to ensure the software recognizes that there is connection between the network modules. The disclosed technique to detect if there is a foreign device connected between the links of network modules uses a combination of both of these methods.

Figure 3:
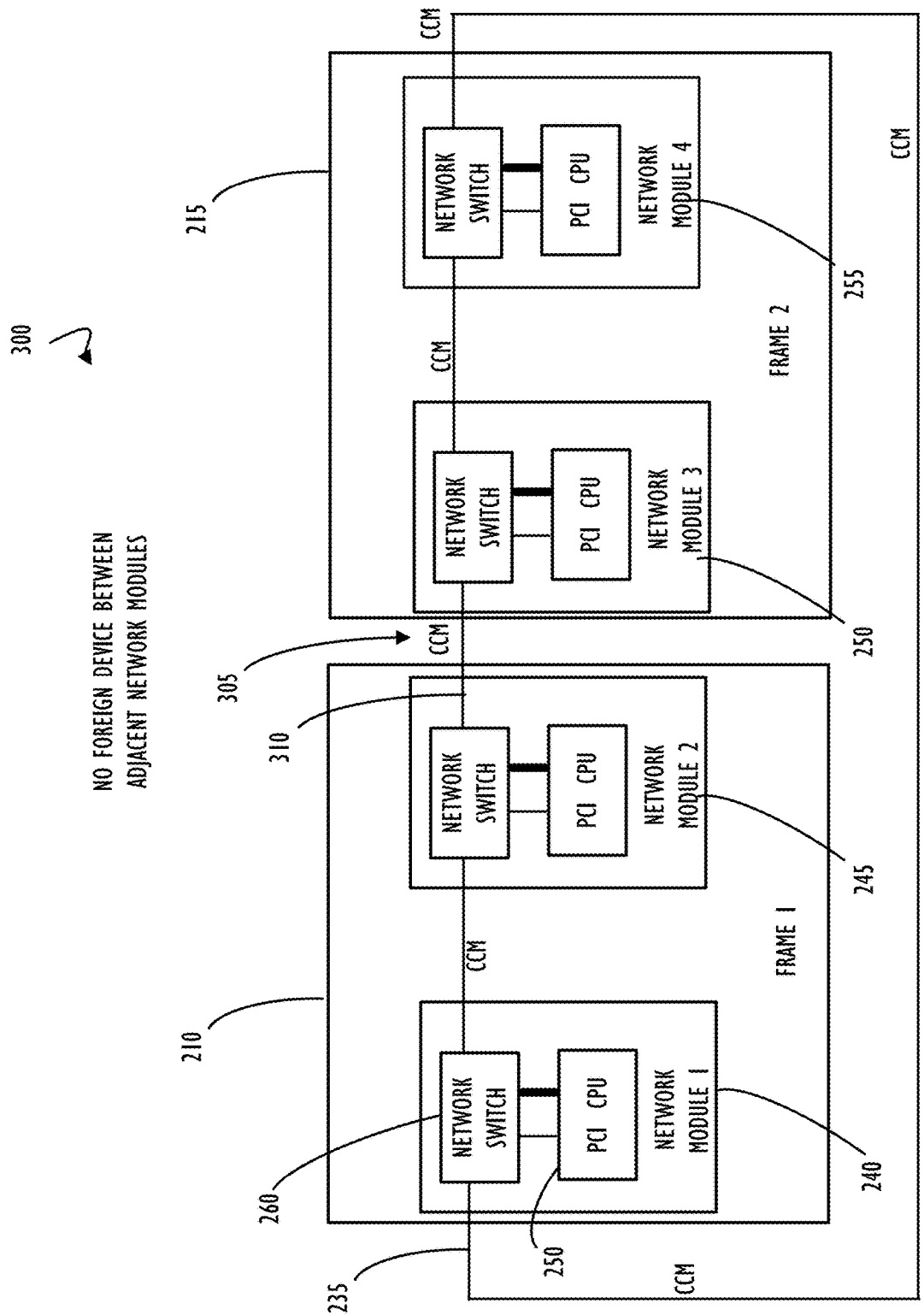
FIG. 3 is a functional block diagram representing a second example of the network of FIG. 2 with the foreign device removed to illustrate the direct connection between two network switches that expect to be physically adjacent to each other on the network, according to one or more disclosed implementations.

Referring now to FIG. 3, a properly connected computer infrastructure 300 is illustrated. FIG. 3 represents substantially the same configuration as was described above for FIG. 2. However, in computer infrastructure 300, the foreign device bridge 270 has been removed and direct connectivity link 310 between network module 2 245 and network module 3 250 has been re-established to correct the connectivity.

In one example implementation, software on each network module sends Continuity Check Messages (CCM) between each network module before a network module enables the link for user traffic. For example, each network module will send 5 CCM packets per second to the other network module. When a network module has received 5 messages per second the link may be enabled for user traffic. Each network module continuously sends 5 CCM messages per second. This technique may also be used to detect software failures.

Figure 4:
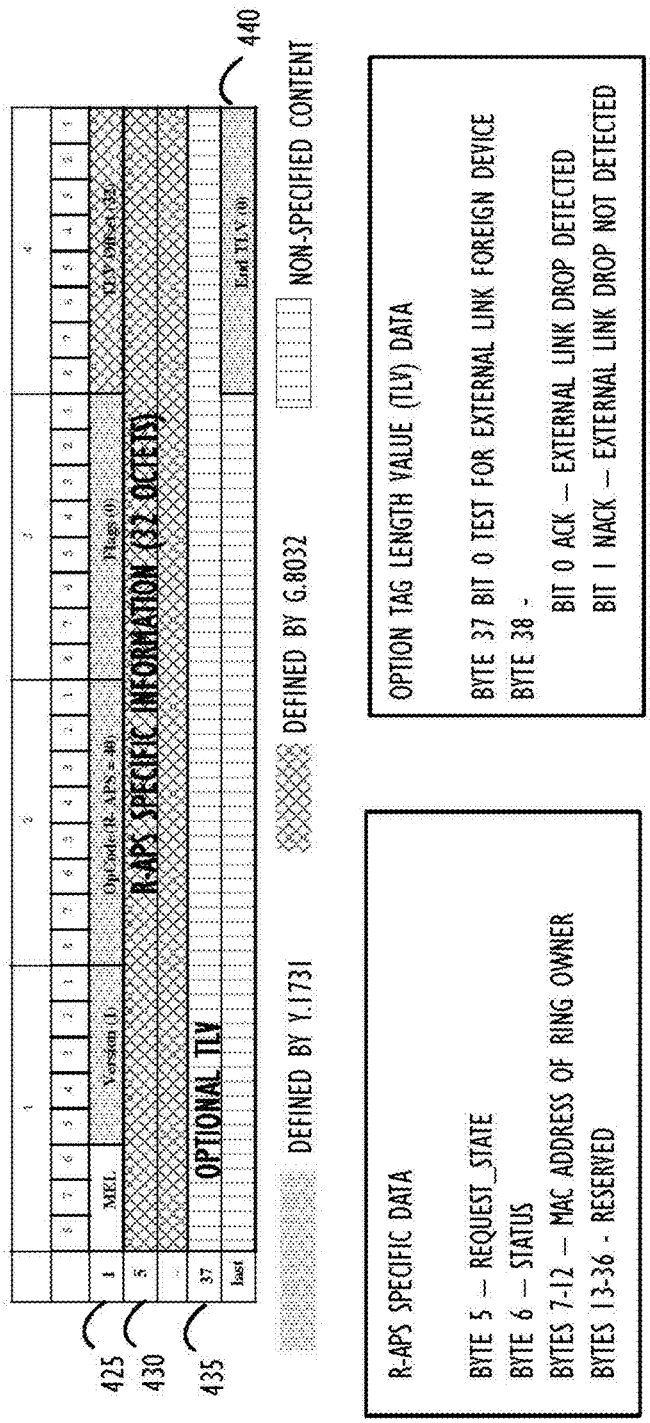
FIG. 4 is a block diagram of a possible detection continuity check message, according to one or more disclosed implementations.

An example CCM message format 400 is illustrated in FIG. 4. The message includes multiple tag length value TLV data packets. Note, a CCM message may be in other formats as well, CCM message format 400 is just an example. The message begins with a format defined by protocol Y.1731 (425) and is followed by a G.8032 format (430). The CCM message format may also include some optional TLV data (435) of a non-specified format and finally ends with an End TLV packet (440).

Figure 5:
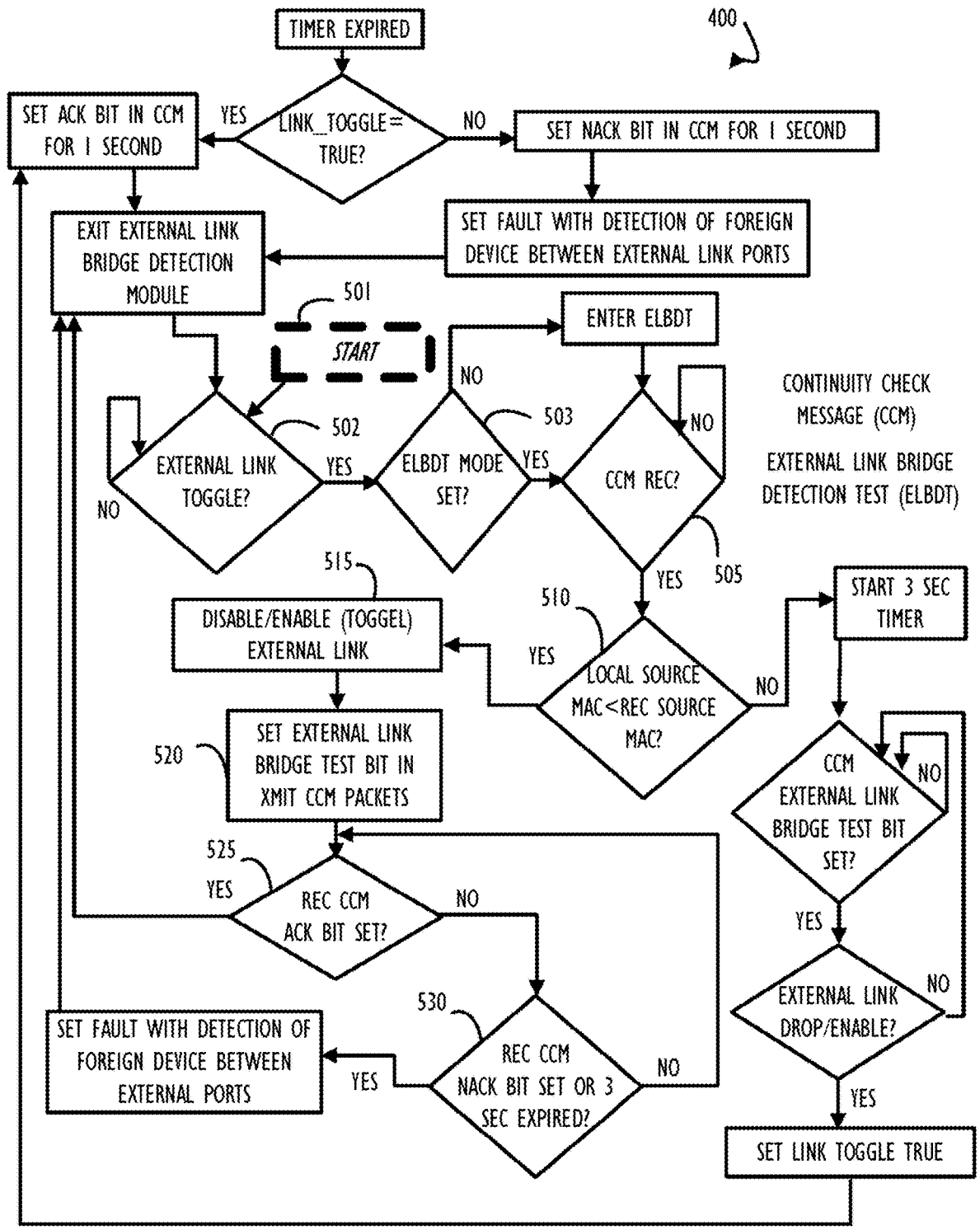
FIG. 5 is a flow chart representing a possible method to perform foreign device detection, according to one or more disclosed implementations.

The method to detect a foreign device between network modules includes a technique to monitor each time the hardware link is enabled. FIG. 5 illustrates an example method 500, starting at start block 501 near the middle of the flow, that may be performed for each network module in the detection process. After a link enable due to a startup, restart, etc., a device to perform an external link toggle 502 may be selected. Bock 503 indicates that External Link Bridge Detection Test (ELBDT) mode will be set at the beginning of the detection process. As part of initiating the test, both network modules (i.e., both a monitor device and the toggle device, roles of which may be later determined) will start transmitting CCM messages. When each network module receives a CCM message 505 it will look at the MAC address of the other network module. If the network module has the lower MAC address 510 it will toggle (disable, then enable) the network link 515. It will then set a TEST bit 520 in the CCM packet stating the link was toggled. The network module with the high MAC address will check each CCM packet for the TEST bit stating that there was a link toggle. The network module with the higher MAC address will respond with an ACK bit set if it also saw a link toggle. The network module with the higher MAC will respond with a NAK if there was not a link toggle. An ACK designates that there was not a foreign device connected between the two network modules 525. A NAK designates that there is a foreign device between the two network modules 530. In general, the NAK indication is sent after a timeout, for example, the higher MAC side waits to determine if the link has toggled for a configurable amount of time (e.g., second) Both network modules will notify the user if a foreign device has been discovered connected in between the network links.

This algorithm may be run each time a link is enabled. Accordingly, the algorithm may be executed when changing cables or rebooting network modules. One advantage for detecting if a foreign device is connected between network modules is that the transmission of data between network modules is more secure. If a bridge is in between two network modules all the transmitted data can be monitored and possibly modified.

This solution also provides the advantage that it is not a CPU intensive method. It is believed that a method of checking packet transmit reception times between devices would be more CPU intensive. The disclosed method may be performed at boot or when a link becomes enabled. This test may be executed to verify no device is inserted between the network modules.

Figure 6:
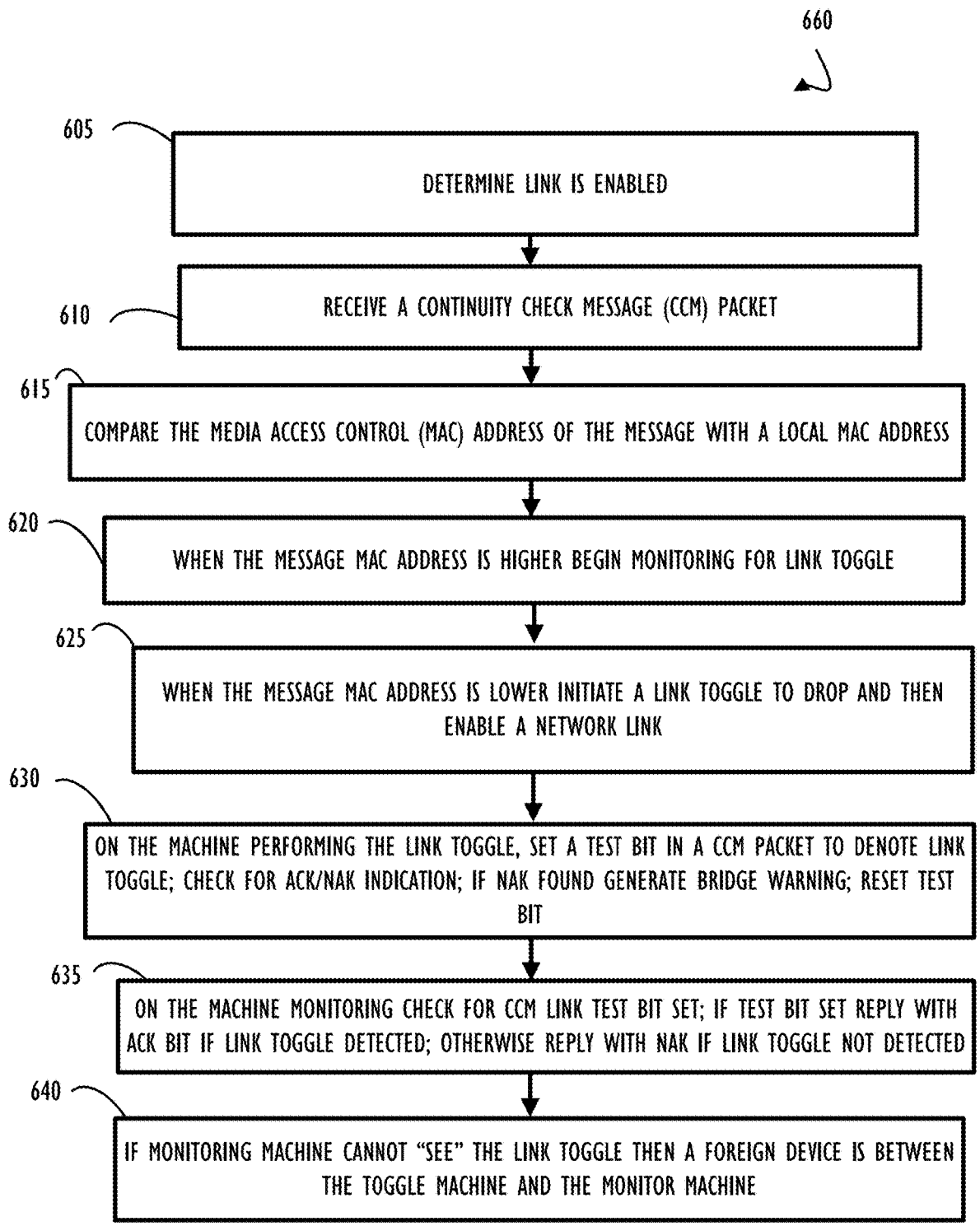
FIG. 6 represents an example method that may be used to actively detect a foreign device disposed between two network nodes that expect to be adjacent to each other, according to one or more disclosed embodiments.

FIG. 6 represent an example method that may be to detect a foreign device in-between two network nodes, according to one or more disclosed embodiments. FIG. 6 illustrates method 600 which begins at block 605 with a determination that a link is enabled for communication. Block 610 indicates that a CCM message is received. Block 615 indicates that a comparison may be performed between the Media Access Control (MAC) address of the message against the MAC address of the local device. Block 620 indicates that when the MAC address in the message is higher than the local MAC address the local machine may go into a monitoring state to look for link toggles. Block 625 indicates that when the MAC address in the message is lower than the local MAC address the local machine may initiate one or more link toggles to drop and enable its network link. Block 630 indicates that the machine performing the link toggle can set a bit in a CCM packet to denote link toggle; check for ACK/NAK indication in further received CCM packets; and if a NAK CCM packet is found generate a bridge (e.g., foreign device detected) warning. After generating the warning this machine can reset the test bit. Block 635 indicates on the machine performing the monitoring, a check for a CCM packet with a test bit set may be performed. If the test bit is set it can reply with an ACK bit when it has further detected the link toggle being performed. Otherwise, if it has not detected the link toggle, it may reply with a NAK packet. Block 640 explains that if the monitoring machine cannot "see" (i.e., detect) the link toggle there must be a foreign device between the machine doing the toggle and this machine (e.g., between toggle machine and monitor machine). Of course, using the higher and lower mac addresses is purely by convention the same technique could be performed in the reverse.

Figure 7:
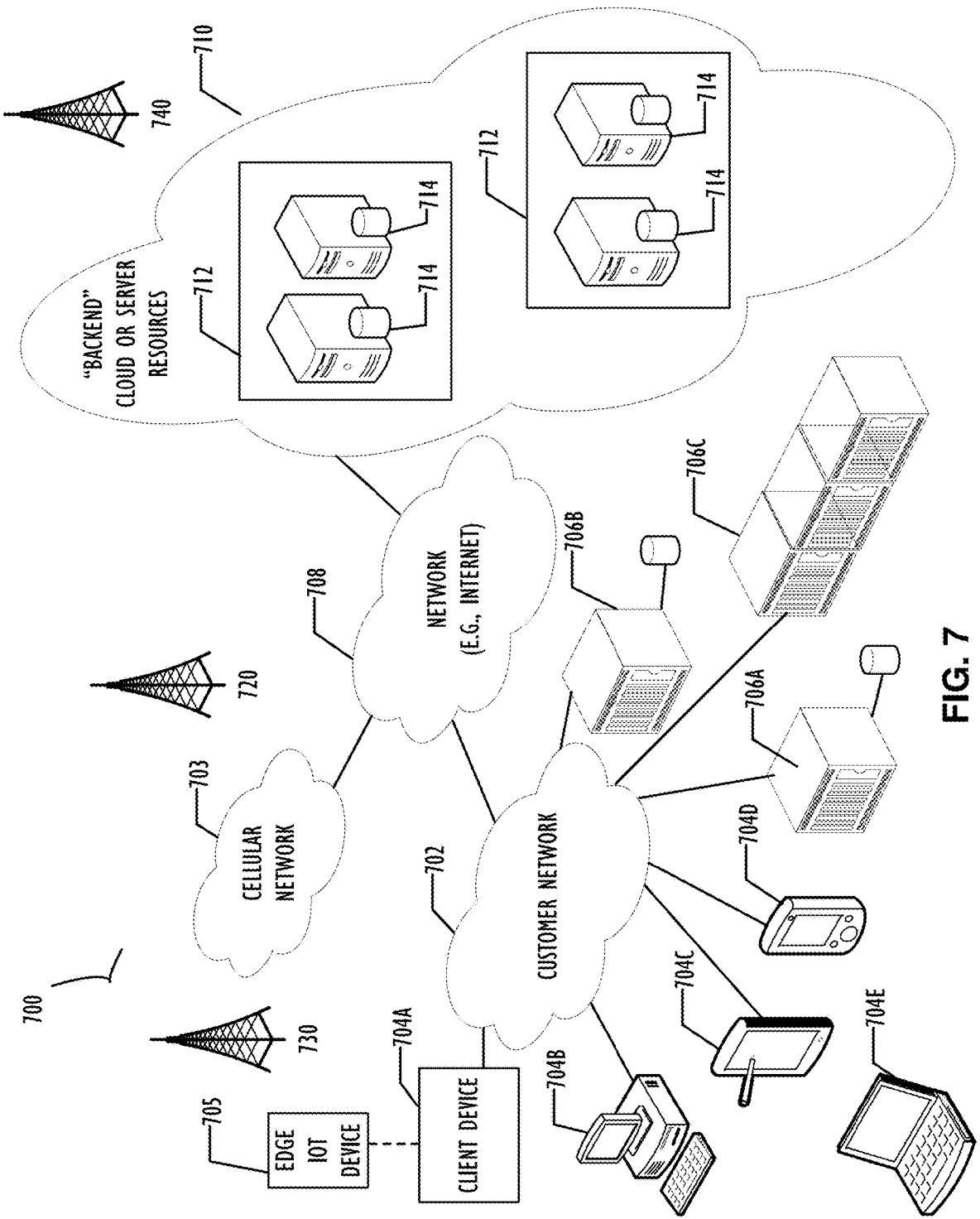
FIG. 7 represents a computer network infrastructure that may be used to implement all or part of the disclosed foreign device detection technique, according to one or more disclosed embodiments.

FIG. 7 represents a computer network infrastructure 700 that may be used to implement all or part of the disclosed foreign device detection technique or provide information flow between a system performing the technique and other computer networks, according to one or more disclosed embodiment. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a foreign device detection method such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the frames outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

Figure 8:
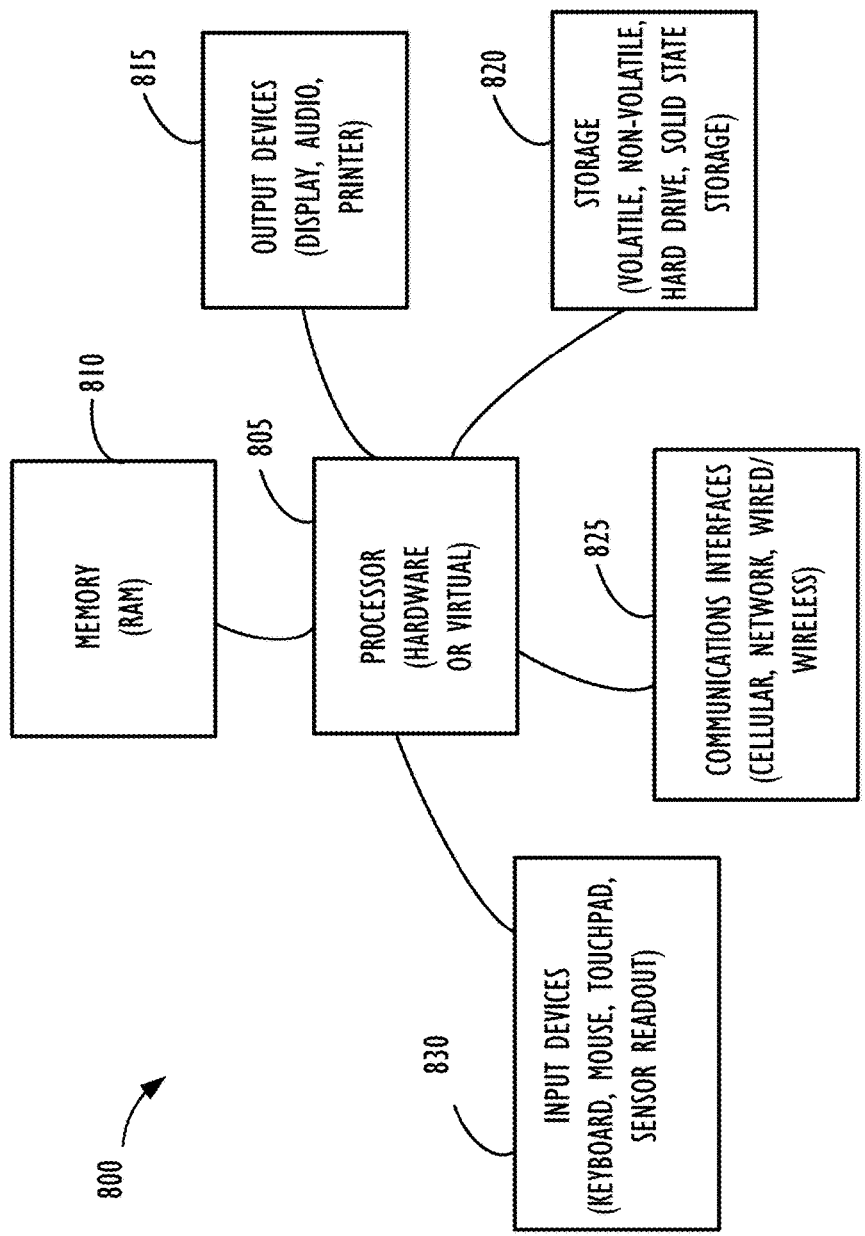
FIG. 8 illustrates a computer processing device that may be used to implement the functions, modules, processing platforms, execution platforms, communication devices, and other methods and processes of this disclosure.

FIG. 8 illustrates a computer processing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
   determining a local network link is enabled;
   receiving, via the local network link, a first continuity check message (CCM) packet;
   comparing a first media access control (MAC) address associated with the first CCM packet to a second MAC address of the local network link;
   identifying a local device as a toggle device based on the comparison;
   identifying a remote device as a monitor device based on the comparison;
   on the toggle device:
      initiating a toggle of a first network interface associated with at least one of the first or second MAC addresses;
      setting a bit in a second CCM packet to indicate the toggle;
      checking additional CCM packets for either an ACK indication or an NAK indication; and
      initiating a foreign device detected warning based on finding the NAK indication; and
   on the monitor device:
      monitoring, on a second network interface associated with at least one of the first or second MAC address, for a link toggle indication of the first network interface;
      checking for the second CCM packet having the bit set to indicate toggle;
      sending a third CCM packet with an ACK indication based on detecting the link toggle indication of the first network interface; and
      sending a fourth CCM packet with a NAK indication based on not detecting the link toggle indication of the first network interface.

2. The computer implemented method of claim 1, wherein the monitor device is selected based on a comparison indicating that the first media access control (MAC) address associated with the first CCM packet is higher than the second MAC address of the local network link.

3. The computer implemented method of claim 1, wherein the monitor device is selected based on a comparison indicating that the first media access control (MAC) address associated with the first CCM packet is lower than the second MAC address of the local network link.

4. The computer implemented method of claim 1, wherein the local network link is the first network interface.

5. The computer implemented method of claim 1, wherein the local network link is the second network interface.

6. The computer implemented method of claim 1, further comprising:
   resetting the bit in a fifth CCM packet on the toggle device after initiating the foreign device detected warning.

7. The computer implemented method of claim 1, wherein the method is initiated upon initialization of a device containing the local network link.

8. A non-transitory computer readable medium comprising computer executable instructions stored thereon that when executed by one or more processing units, perform a method to detect a foreign device in a network segment, the method comprising:
   determining a local network link is enabled;
   receiving, via the local network link, a first continuity check message (CCM) packet;
   comparing a first media access control (MAC) address associated with the first CCM packet to a second MAC address of the local network link;
   identifying a local device as a toggle device based on the comparison;
   identifying a remote device as a monitor device based on the comparison;
   on the toggle device:
      initiating a toggle of a first network interface associated with at least one of the first or second MAC addresses;
      setting a bit in a second CCM packet to indicate the toggle;
      checking additional CCM packets for either an ACK indication or an NAK indication; and
      initiating a foreign device detected warning based on finding the NAK indication; and
   on the monitor device:
      monitoring, on a second network interface associated with at least one of the first or second MAC address, for a link toggle indication of the first network interface;
      checking for the second CCM packet having the bit set to indicate toggle;
      sending a third CCM packet with an ACK indication based on detecting the link toggle indication of the first network interface; and
      sending a fourth CCM packet with a NAK indication based on not detecting the link toggle indication of the first network interface.

9. The non-transitory computer readable medium of claim 8, wherein the monitor device is selected based on a comparison indicating that the first media access control (MAC) address associated with the first CCM packet is higher than the second MAC address of the local network link.

10. The computer implemented method of claim 8, wherein the monitor device is selected based on a comparison indicating that the first media access control (MAC) address associated with the first CCM packet is lower than the second MAC address of the local network link.

11. The non-transitory computer readable medium of claim 8, wherein the local network link is the first network interface.

12. The non-transitory computer readable medium of claim 8, wherein the local network link is the second network interface.

13. The non-transitory computer readable medium of claim 8, wherein the method further comprises:
   resetting the bit in a fifth CCM packet on the toggle device after initiating the foreign device detected warning.

14. A computer network, comprising:
   a toggle device including a first network communications interface communicatively coupled to the computer network;
   a monitor device including a second network interface communicatively coupled to the computer network;
   a memory; and
   one or more processing units, communicatively coupled to the memory and at least one of the first of second network communications interface, wherein the memory stores instructions, that when executed by the one or more processing units, cause the one or more processing units to provide a foreign device detection function, the foreign device detection function configured to:
      determine a local network link is enabled to communicate with the computer network;
      receive, via the computer network, a first continuity check message (CCM) packet;

comparing a first media access control (MAC) address associated with the first CCM packet to a second MAC address of the local network link;

identifying the monitor device and the toggle device based on the comparison;

on the toggle device:
  initiating a toggle of the first network interface associated with at least one of the first or second MAC addresses;
  setting a bit in a second CCM packet to indicate the toggle;
  checking additional CCM packets for either an ACK indication or an NAK indication; and
  initiating a foreign device detected warning based on finding the NAK indication; and on the monitor device:
  monitoring, on the second network interface associated with at least one of the first or second MAC address, for a link toggle indication of the first network interface;
  checking for the second CCM packet having the bit set to indicate toggle;
  sending a third CCM packet with an ACK indication based on detecting the link toggle indication of the first network interface; and
  sending a fourth CCM packet with a NAK indication based on not detecting the link toggle indication of the first network interface.

15. The computer network of claim 14, wherein the monitor device is selected based on a comparison indicating that the first media access control (MAC) address associated with the first CCM packet is higher than the second MAC address of the local network link.

16. The computer network of claim 14, wherein the monitor device is selected based on a comparison indicating that the first media access control (MAC) address associated with the first CCM packet is lower than the second MAC address of the local network link.

17. The computer network of claim 14, wherein the local network link is the first network interface.

18. The computer network of claim 14, wherein the local network link is the second network interface.

19. The computer network of claim 14, further comprising:
  resetting the bit in a fifth CCM packet on the toggle device after initiating the foreign device detected warning.

20. The computer network of claim 14, wherein the method is initiated upon initialization of a device containing the local network link.

* * * * *